(12) United States Patent
Huang et al.

(10) Patent No.: US 10,778,394 B2
(45) Date of Patent: Sep. 15, 2020

(54) JOINT TRANSMISSION OF PRECODED AND UNPRECODED SOUNDING REFERENCE SIGNALS IN UPLINK

(71) Applicant: QUALCOMM Incorporated, San Diego, CA (US)

(72) Inventors: Yi Huang, San Diego, CA (US); Wei Zeng, San Diego, CA (US); Wanshi Chen, San Diego, CA (US); Hao Xu, Beijing (CN); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/594,960

(22) Filed: Oct. 7, 2019

(65) Prior Publication Data
US 2020/0044804 A1   Feb. 6, 2020

Related U.S. Application Data

(62) Division of application No. 15/689,476, filed on Aug. 29, 2017, now Pat. No. 10,469,224.

(Continued)

(51) Int. Cl.
| | |
|---|---|
| *H04W 4/00* | (2018.01) |
| *H04L 5/00* | (2006.01) |
| *H04B 7/0413* | (2017.01) |
| *H04B 7/06* | (2006.01) |
| *H04L 1/00* | (2006.01) |

(Continued)

(52) U.S. Cl.
CPC ......... *H04L 5/0048* (2013.01); *H04B 7/0413* (2013.01); *H04B 7/0615* (2013.01); *H04L 1/0009* (2013.01); *H04L 5/0037* (2013.01); *H04L 5/0051* (2013.01);

(Continued)

(58) Field of Classification Search
USPC .......................................... 370/328, 329; 1/1
See application file for complete search history.

(56) References Cited

U.S. PATENT DOCUMENTS

| | | |
|---|---|---|
| 2011/0292825 A1 | 12/2011 | Lee, II et al. |
| 2012/0014349 A1 | 1/2012 | Chung et al. |

(Continued)

OTHER PUBLICATIONS

International Preliminary Report on Patentability—PCT/US2017/049447, The International Bureau of WIPO—Geneva, Switzerland, dated Apr. 11, 2019.

(Continued)

*Primary Examiner* — David Q Nguyen
(74) *Attorney, Agent, or Firm* — Haynes and Boone, LLP

(57) ABSTRACT

Both precoded sounding reference signals (SRS) and unprecoded SRS are transmitted from a UE to an eNB. The UE may transmit both in the same subframe using either TDM or FDM. Or the UE may transmit each in different subframes from each other. The eNB uses some combination of the precoded SRS and the unprecoded SRS in scheduling resources for the UE. The eNB may also provide instruction to the UE for PUSCH precoding for data transmission. The eNB may signal the UE to use the same precoding as for the precoded SRS. The eNB may instead signal the UE to use different precoding by including the precoding information or delta information between the precoding used for the precoded SRS and the selected precoding for the PUSCH data.

14 Claims, 8 Drawing Sheets

Related U.S. Application Data

(60) Provisional application No. 62/402,141, filed on Sep. 30, 2016.

(51) Int. Cl.
    *H04B 7/0404*     (2017.01)
    *H04W 88/02*     (2009.01)
    *H04W 88/08*     (2009.01)

(52) U.S. Cl.
    CPC ........... *H04B 7/0404* (2013.01); *H04W 88/02* (2013.01); *H04W 88/08* (2013.01)

(56) References Cited

U.S. PATENT DOCUMENTS

| | | | |
|---|---|---|---|
| 2012/0065153 A1 | 3/2012 | Petitou et al. | |
| 2012/0275411 A1* | 11/2012 | Kim | H04B 7/024 370/329 |
| 2013/0039319 A1* | 2/2013 | Shi | H04L 5/0023 370/329 |
| 2013/0343215 A1 | 12/2013 | Li et al. | |
| 2014/0010182 A1* | 1/2014 | Chunli | H04L 5/0048 370/329 |
| 2014/0092877 A1 | 4/2014 | Kazmi et al. | |
| 2014/0112168 A1 | 4/2014 | Chen et al. | |
| 2014/0376398 A1 | 12/2014 | Li et al. | |
| 2015/0065153 A1 | 3/2015 | Nissila et al. | |
| 2015/0222402 A1 | 8/2015 | Ouchi et al. | |
| 2016/0192385 A1 | 6/2016 | Tooher et al. | |
| 2016/0270060 A1* | 9/2016 | Kusashima | H04L 5/1415 |
| 2016/0344526 A1* | 11/2016 | Fan | H04L 5/0048 |
| 2018/0097595 A1 | 4/2018 | Huang et al. | |
| 2019/0199553 A1* | 6/2019 | Park | H04B 7/0626 |

OTHER PUBLICATIONS

International Search Report and Written Opinion—PCT/US2017/049447—ISA/EPO—dated Nov. 14, 2017.

NTT Docomo: "SRS Enhancement for Elevation BF and FD-MIMO," 3GPP Draft; R1-154663, 3rd Generation Partnership Project (3GPP), Mobile Competence Centre; 650, Route Des Lucioles; F-06921 Sophia-Antipolis Cedex; France, vol. RAN WG1, No. Beijing, China; Aug. 24, 2015-Aug. 28, 2015; Aug. 23, 2015 (Aug. 23, 2015), 3 pages, XP051039542, Retrieved from the Internet: URL:http://www.3gpp.org/ftp/Meetings_3GPP_SYNC/RAN1/Docs/ [retrieved on Aug. 23, 2015].

Qualcomm Inc: "SRS Capacity Enhancements," 3GPP Draft; R1-153881, 3rd Generation Partnership Project (3GPP), Mobile Competence Centre, 650, Route Des Lucioles; F-06921 Sophia-Antipolis Cedex; France; vol. RAN WG1, No. Beijing, China; Aug. 24, 2015-Aug. 28, 2015; Aug. 23, 2015 (Aug. 23, 2015), 4 pages, XP051001317, Retrieved from the Internet: URL:http://www.3gpp.org/ftp/Meetings_3GPP_SYNC/RAN1/Docs/ [retrieved on Aug. 23, 2015].

\* cited by examiner

JOINT TRANSMISSION OF PRECODED AND UNPRECODED SOUNDING REFERENCE SIGNALS IN UPLINK

CROSS REFERENCE TO RELATED APPLICATIONS

The present application is a Divisional Application of U.S. Non-Provisional application Ser. No. 15/689,476 filed Aug. 29, 2017, which claims priority to and the benefit of the U.S. Provisional Patent Application No. 62/402,141, filed Sep. 30, 2016, each of which is hereby incorporated by reference in its entirety as if fully set forth below in its entirety and for all applicable purposes.

TECHNICAL FIELD

Aspects of the present disclosure relate generally to wireless communication systems, and more particularly, to transmitting both precoded sounding reference signals and unprecoded sounding reference signals from a user equipment, where the eNodeB may use some combination of both in scheduling resources.

INTRODUCTION

In wireless communication networks, sounding reference signals are transmitted in the uplink (UL) for use by base stations or eNodeBs (eNB) for a variety of aspects. Some of these include, for example, downlink scheduling, uplink scheduling (e.g., resource block allocation, rank assignment, modulation and coding scheme, etc.), and coordinated multipoint processing to name a few examples.

In current approaches, sounding reference signals (SRS) are unprecoded, meaning that the transmitting user equipment (UE) has not used beam steering to manipulate the antennas in a multiple input/multiple output (MIMO) system with particular weights to influence the radiation pattern from the UE. Further, precoded SRS are not envisioned as being used with unprecoded SRS. This results in reduced UL performance given the lack of either aspect of information when only the other is used.

As a result, there is a need for techniques to allow providing both SRS types so as to improve UL efficiency with increased flexibility at the eNB.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method is provided that includes generating, by a first wireless communications device, a precoded sounding reference signal (SRS). The method further includes generating, by the first wireless communications device, an unprecoded SRS separate from the precoded SRS. The method further includes transmitting, by the first wireless communications device, the precoded SRS and the unprecoded SRS to a second wireless communications device via an uplink channel.

In an additional aspect of the disclosure, a method is provided that includes receiving, by a first wireless communications device, a precoded sounding reference signal (SRS) from a second wireless communications device. The method further includes receiving, by the first wireless communications device, an unprecoded SRS separate from the precoded SRS from the second wireless communications device. The method further includes determining, by the first wireless communications device, a resource scheduling for the second wireless communications device based on a combination of the precoded SRS and the unprecoded SRS.

In an additional aspect of the disclosure, an apparatus is provided that includes a processor configured to generate a precoded sounding reference signal (SRS). The processor is further configured to generate an unprecoded SRS separate from the precoded SRS. The apparatus further includes a transceiver configured to transmit the precoded SRS and the unprecoded SRS to a wireless communications device via an uplink channel.

In an additional aspect of the disclosure, an apparatus is provided that includes a transceiver configured to receive a precoded sounding reference signal (SRS) from a wireless communications device. The transceiver is further configured to receive an unprecoded SRS separate from the precoded SRS from the wireless communications device. The apparatus further includes a processor configured to determine a resource scheduling for the second wireless communications device based on a combination of the precoded SRS and the unprecoded SRS.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
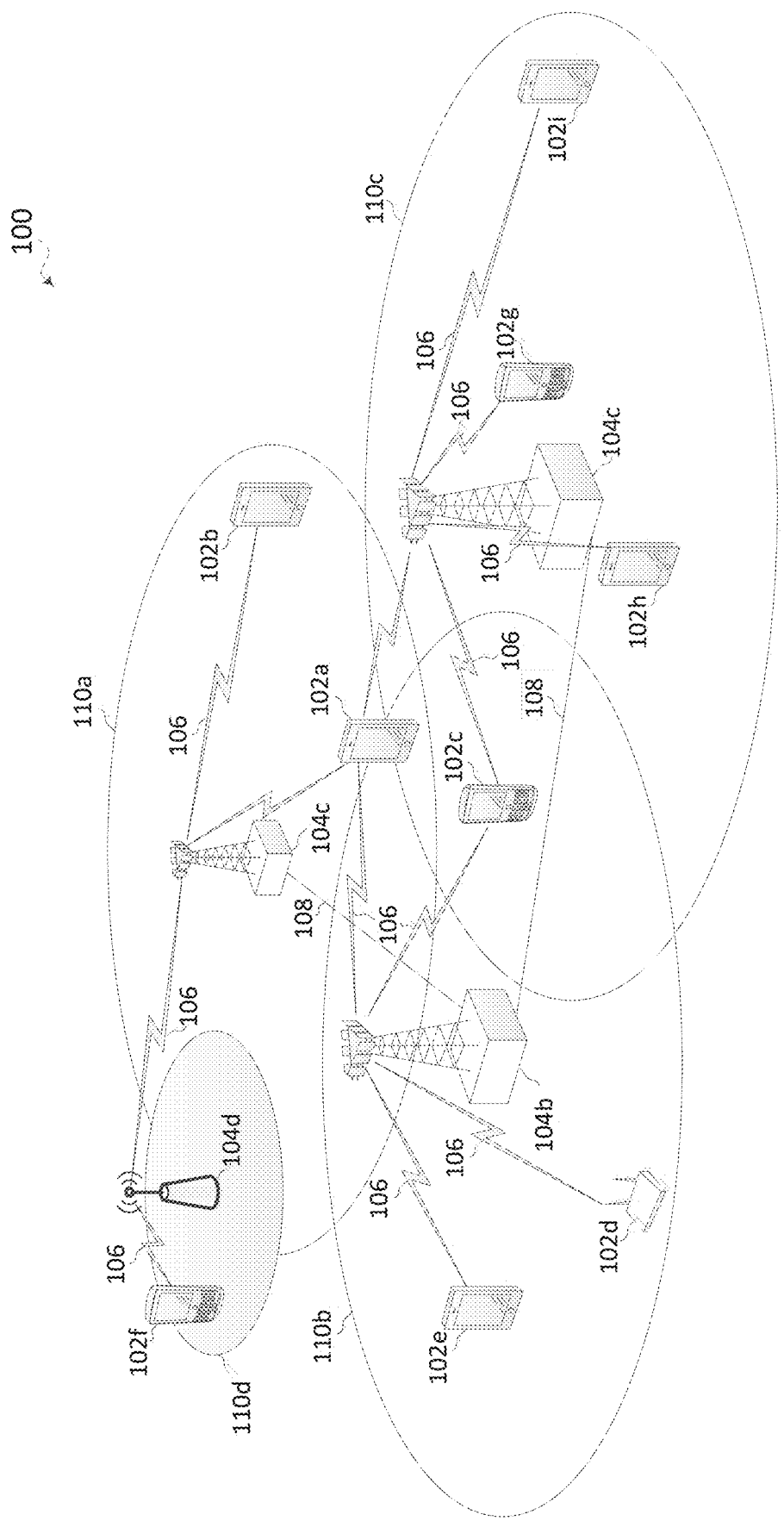
FIG. 1 illustrates an exemplary wireless communication environment according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA, LTE networks, GSM networks, and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. CDMA2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., 5th Generation (5G)) network.

Further, devices may also communicate with one another using various peer-to-peer technologies such as LTE-Direct (LTE-D), Bluetooth, Bluetooth Low Energy (BLE), ZigBee, radio frequency identification (RFID), and/or other ad-hoc or mesh network technologies. Embodiments of this disclosure are directed to any type of modulation scheme that may be used on any one or more of the above-recited networks and/or those yet to be developed.

Embodiments of the present disclosure introduce systems and techniques to transmit both precoded sounding reference signals and unprecoded sounding reference signals from a UE to an eNB, where the eNB may use some combination of both in scheduling resources for the UE.

For example, a UE may include both precoded SRS as well as unprecoded SRS in UL transmissions to an eNB (e.g., whether in periodic or aperiodic SRS uses). The precoding may involve weighting different antennas of a UE different amounts, so as to cause the UE to steer its radiation pattern, or beam, in a particular direction. The unprecoded SRS applies equal beam weights to each antenna of the UE. In some examples, the UE may make the determination of the specific precoding to apply to the SRS, such as based on DL reference signals from the eNB. In other examples, the UE may receive instruction from an eNB on a precoding to apply for an SRS.

The UE transmits the precoded SRS and the unprecoded SRS in the UL to the eNB. For example, the UE may use a time division multiplexing (TDM) approach, such that both precoded SRS and unprecoded SRS are included in a same subframe, each using the same tone or band of tones at different time slots (or symbol periods) in the same subframe. As another example, the UE may use a frequency division multiplexing approach, such that both the precoded SRS and unprecoded SRS are included in a same subframe, at the same time slot but using different tones (or subcarriers) with respect to each other. As another example, the UE may use different resource slots (time and/or frequency) in different subframes to transmit the precoded SRS and unprecoded SRS—thus, one of the SRS (e.g., precoded) may be transmitted in a first subframe followed, in a later subframe, by the other SRS (e.g., unprecoded, or vice versa).

The eNB receives both SRS types after transmission from the UE. With both precoded SRS and unprecoded SRS, the eNB has flexibility in use of these SRS in various functions, including PUSCH scheduling (e.g., RB allocation), UL rank assignments, UL MCS assignments, etc. For example, the eNB may determine to use the received precoded SRS for one aspect of scheduling/assignment and the received unprecoded SRS for another aspect of scheduling/assignment based on existing channel conditions. Any combination is possible in order to arrive at scheduling/assignment according to embodiments of the present disclosure.

In addition, the eNB may provide instruction to the UE for PUSCH precoding for data transmission. For example, after receiving both precoded SRS and unprecoded SRS from the UE, the eNB may determine that the UE will use the same precoding as was used for the precoded SRS. In that example, a single bit in a DL message may be used to signal the UE to use the same precoding for PUSCH data transmission. When the same precoding is not going to be used, then the eNB may not assert that bit.

In the bit is not asserted, the UE may further listen for additional signaling from the eNB identifying other precoding that the UE should use for transmitting data in the PUSCH. In some examples, the eNB may include the precoding data in full for use in PUSCH by the UE. A way to reduce signaling overhead is for the eNB to determine a delta between the precoding used for the precoded SRS and the precoding for the PUSCH that the eNB selects for the UE. The eNB may transmit that delta, instead of the full details of the precoding for the PUSCH, to the UE. This may provide more efficient use of resources as the signaling overhead may be reduced as compared to the option of transmitting the full amount of data. In turn, the UE receiving the delta information may recover the precoding for PUSCH by adding or multiplying the delta information with the precoding previously used for the SRS (whether addition or multiplication).

FIG. 1 illustrates a wireless communication network 100 in accordance with various aspects of the present disclosure.

The wireless communication network 100 may include a number of UEs 102, as well as a number of evolved Node Bs (eNodeB, or eNB) 104. The eNBs 104 may also be referred to generally as base stations. An eNB 104 may also be referred to as an access point, base transceiver station, a node B, etc. An eNB 104 may be a station that communicates with the UEs 102.

The eNBs 104 communicate with the UEs 102 as indicated by communication signals 106. A UE 102 may communicate with the eNB 104 via an uplink and a downlink. The downlink (or forward link) refers to the communication link from the eNB 104 to the UE 102. The uplink (or reverse link) refers to the communication link from the UE 102 to the eNB 104. The eNBs 104 may also communicate with one another, directly or indirectly, over wired and/or wireless connections, as indicated by communication signals 108.

UEs 102 may be dispersed throughout the wireless network 100, as shown, and each UE 102 may be stationary or mobile. The UE 102 may also be referred to as a terminal, a mobile station, a subscriber unit, etc. The UE 102 may be a cellular phone, a smartphone, a personal digital assistant, a wireless modem, a laptop computer, a tablet computer, a drone, an entertainment device, a hub, a gateway, an appliance, a wearable, peer-to-peer and device-to-device components/devices (including fixed, stationary, and mobile), Internet of Things (IoT) components/devices, and Internet of Everything (IoE) components/devices, etc. The wireless communication network 100 is one example of a network to which various aspects of the disclosure apply.

Each eNB 104 may provide communication coverage for a particular geographic area. In 3GPP, the term "cell" can refer to this particular geographic coverage area of an eNB and/or an eNB subsystem serving the coverage area, depending on the context in which the term is used. In this regard, an eNB 104 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like).

An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 104a, 104b and 104c are examples of macro eNB for the coverage areas 110a, 110b and 110c, respectively (also referred to as cells herein). The eNBs 104d and 104e are examples of pico and/or femto eNBs for the coverage areas 110d and 110e, respectively. An eNB 104 may support one or multiple (e.g., two, three, four, and the like) cells.

The wireless communication network 100 may also include relay stations. A relay station is a station that receives a transmission of data and/or other information from an upstream station (e.g., an eNB, a UE, or the like) and sends a transmission of the data and/or other information to a downstream station (e.g., another UE, another eNB, or the like). A relay station may also be a UE that relays transmissions for other UEs. A relay station may also be referred to as a relay eNB, a relay UE, a relay, and the like. Some relays may also have UE capabilities/functionalities.

The wireless communication network 100 may support synchronous or asynchronous operation. For synchronous operation, the eNBs 104 may have similar frame timing, and transmissions from different eNBs 104 may be approximately aligned in time. For asynchronous operation, the eNBs 104 may have different frame timing, and transmissions from different eNBs 104 may not be aligned in time.

In some implementations, the wireless communication network 100 utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

According to embodiments of the present disclosure, the UEs 102 may include both precoded SRS as well as unprecoded SRS in UL transmissions to eNBs 104 (e.g., whether in periodic or aperiodic SRS uses). The precoding may involve weighting different antennas of a UE 102 different amounts, so as to cause the UE 102 (an exemplary UE 102 in FIG. 1) to steer its radiation pattern, or beam, in a particular (e.g., desired) direction. Additionally, the SRS precoding granularity may be wideband (same precoder applied across all tones) or narrow band (up to per tone precoding). The unprecoded SRS refers to a SRS in which equal beam weights are applied to each antenna of a UE 102, so that no beam steering occurs outside of the regular configuration of the antennas.

In some examples, the UE 102 may make the determination of the specific precoding. For example, the UE 102 may receive one or more downlink (DL) reference signals, such as CSI-RS (channel state information-reference signals), from an eNB 104 and, according to the channel quality of the DL channel determined from the reference signals, identify a direction that is desirable in which to steer a beam of the UE 102. In other examples, the UE 102 may receive instruction from an eNB 104 on a precoding to apply for an SRS (e.g., based on a measure of UL channel quality made at the eNB 104 with respect to one or more signals from the UE 102 and/or estimated from any other UE 102's signals).

The UE 102 may transmit the precoded SRS and the unprecoded SRS in the UL in a variety of ways. For example, the UE 102 may use a time division multiplexing approach, such that both precoded SRS and unprecoded SRS are included in a same subframe, each using the same tone or band of tones at different time slots in the same subframe. Alternatively, the UE 102 may use a frequency division multiplexing approach, such that both the precoded SRS and unprecoded SRS are again included in a same subframe, though with this approach each uses the same time slot but different tones from among the available/selected frequency band with respect to each other. As another alternative, the UE 102 may use different resource slots (time and/or frequency) in different subframes to transmit the precoded SRS and unprecoded SRS—thus, one of the SRS (e.g., precoded) may be transmitted in a first subframe followed, in a later subframe, by the other SRS (e.g., unprecoded, or vice versa). In some embodiments, the subframes may be contiguous to each other in time, while in other embodiments the subframes may have one or more other subframes in between. Further, under any of the above-noted alternatives, each SRS is not limited as to which symbols in a given subframe they are to be located.

Whatever the approach taken in transmitting both of the precoded SRS and the unprecoded SRS, the eNB 104 receives both SRS types. With both precoded SRS and unprecoded SRS, the eNB 104 has flexibility in use of these SRS in various functions, including PUSCH scheduling (e.g., RB allocation), UL rank assignments, UL MCS assignments, etc. For example, the eNB 104 may determine to use the received precoded SRS for one aspect of scheduling/assignment and the received unprecoded SRS for another aspect of scheduling/assignment based on existing channel conditions—e.g., unprecoded SRS for RB allocation, precoded SRS for rank assignment, and both for MCS scheduling. This is just one example. Any combination is possible in order to arrive at scheduling/assignment according to embodiments of the present disclosure. For example, an SRS may be used for several purposes, including sounding the UL channel for UL PUSCH scheduling at the eNB 104 and (where there is DL/UL channel symmetricity, or it is at least assumed) for DL PDSCH scheduling.

Looking first at UL PUSCH scheduling, in embodiments the precoded SRS may be used. Where the UE 102 has multiple transmit ports, an eNB 104 may configure the UE 102 to sound multiple SRS (e.g., over different symbols as an example), each SRS with a different precoder. Then, the eNB 104 may measure the differently precoded SRS over different symbols and select the best precoder (i.e., the precoded SRS with the best measured characteristic from among the precoded SRSs measured). With the precoder selected, the eNB 104 may signal the UE 102 to use that selected precoder for UL PUSCH transmission.

Looking then at DL PDSCH scheduling, an unprecoded SRS may be used in embodiments. For example, the eNB 104 may seek to learn about the channel to determine what the best precoder may be for DL PDSCH transmission (e.g., to maximize throughput). In order to make this determination, the eNB 104 may first determine properties of the raw channel (i.e., unprecoded channel) for DL. After this, the eNB 104 may apply singular vector decomposition (SVD) or another approach, based on the determined properties of the raw channel, to determine the best precoder for DL PDSCH transmission.

Accordingly, the UE 102 may transmit an unprecoded SRS, which the eNB 104 measures and from which the eNB 104 obtains the raw channel properties. The eNB 104 may assume that the DL raw channel is symmetric to the UL raw channel (e.g., with just a scalar difference due to UL/DL transmit power imbalance), which assumption for example typically holds for a time division duplex system. Because of the assumption by the eNB 104 in such embodiments that the learned UL raw channel is the same as the DL raw channel with perhaps a scalar difference, the eNB 104 may determine a precoder for DL PDSCH transmission based on the raw UL channel.

Further, the precoded SRS may be used for DL PDSCH scheduling. This relates to whether the eNB 104 has knowledge of the UE 102's measured covariance matrix of interference plus noise. The unprecoded SRS may be used by the eNB 104 for DL PDSCH scheduling if the UE 102 feeds back to the eNB 104 the measured interference plus noise covariance matrix. For example, where the UE 102 feeds back the measured interference plus noise covariance matrix, the eNB 104 may use the unprecoded SRS to determine the raw channel, calculate the whitening matrix based on that measured interference plus noise, and determine the precoder for DL PDSCH transmission as discussed above.

If, however, the UE 102 does not feed back the measured covariance matrix of interference plus noise, then the eNB 104 may use the precoded SRS. For example, the UE 102 may set the precoder for the SRS to be the same as the whitening matrix (e.g., the interference plus noise measured at the UE 102) for the UE 102. The UE 102 may use the precoded SRS to deliver the whitened channel information to the eNB 104. Upon reaching the eNB 104, the eNB 104 has information about the whitened channel based on the precoded SRS. The eNB 104 may apply SVD on the whitened channel information to determine a precoder for DL PDSCH transmission. Thus, if the whitening is done by the eNB 104, then the unprecoded SRS may be used to determine a precoder for DL PDSCH transmission, while if whitening is done at the UE 102, then the precoded SRS may be used to determine a precoder for DL PDSCH transmission.

In addition to determining how to use the received precoded SRS and unprecoded SRS, an eNB 104 may provide instruction to UEs 102 for PUSCH precoding for data transmission. For example, after receiving both precoded SRS and unprecoded SRS from an UE 102, an eNB 104 may determine that the UE 102 will use the same precoding as was used for the SRS. In that example, a single bit in a DL message (e.g., in the DL control channel) may be used to signal the UE 102 (e.g., the bit asserted) to use the same precoding for PUSCH data transmission. When the same precoding is not going to be used, then the eNB 104 may not assert that bit, which the UE 102 will interpret accordingly.

In that situation, the UE 102 may further listen for further signaling from the eNB 104 identifying other precoding that the UE 102 should use for transmitting data in the PUSCH. In some examples, the eNB 104 may include the precoding data for use in PUSCH by the UE 102. This may consume signaling overhead to an undesirable extent. To reduce that signaling overhead, the eNB 104 may determine a delta between the precoding used for the SRS from the UE 102 and the precoding for the PUSCH that the eNB 104 selects for the UE 102. The eNB 104 may transmit that delta, instead of the full details of the precoding for the PUSCH, to the UE 102. This may provide more efficient use of resources as the signaling overhead may be reduced as compared to the other option. In turn, the UE 102 receiving the delta information may recover the precoding for PUSCH by adding or multiplying the delta information with the precoding previously used for the SRS (whether addition or multiplication is used may be configured previously between the eNB 104 and UE 102, such as at device initialization or other time). Further, the eNB 104 may signal, during operation, the UE 102 to transition to one or the other (addition or multiplication).

Figure 2:
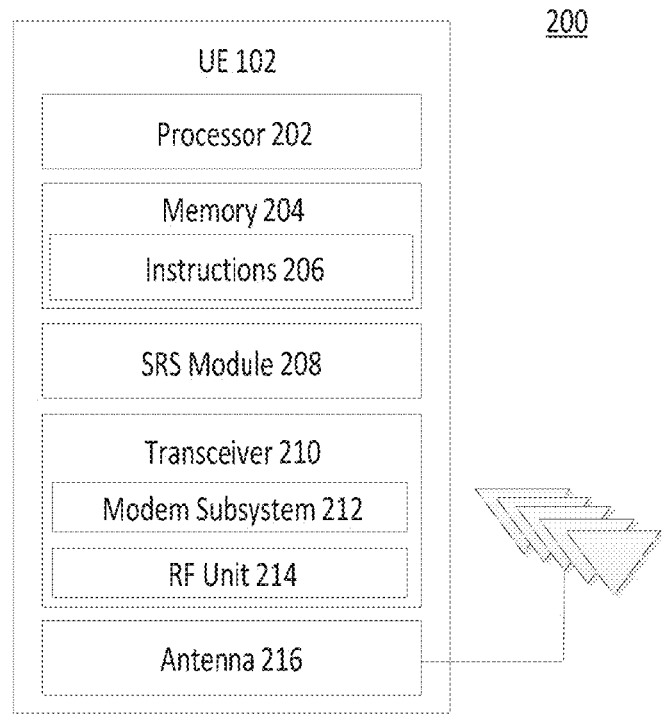
FIG. 2 is a block diagram of an exemplary wireless communication device according to embodiments of the present disclosure.

FIG. 2 is a block diagram of an exemplary wireless communication device 200 according to embodiments of the present disclosure. The wireless communication device 200 may be a UE having any one of many configurations described above. For purposes of example, wireless communication device 200 may be a UE 102 as discussed above with respect to FIG. 1. The UE 102 may include a processor 202, a memory 204, an SRS module 208, a transceiver 210 (including a modem 212 and RF unit 214), and an antenna 216. These elements may be in direct or indirect communication with each other, for example via one or more buses.

The processor 202 may have various features as a specific-type processor. For example, these may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein with reference to the UEs 102 introduced in FIG. 1 above. The processor 202 may also be implemented as a combination of computing devices, e.g., a combination of a DSP and a microprocessor, a plurality of microprocessors, one or more microprocessors in conjunction with a DSP core, or any other such configuration.

The memory 204 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some embodiments, the memory 204 may include a non-transitory computer-readable medium. The memory 204 may store instructions 206. The instructions 206 may include instructions that, when executed by the processor 202, cause the processor 202 to perform operations described herein with reference to a UE 102 in connection with embodiments of the present disclosure. The terms "instructions" and "code" may include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The SRS module 208 may be used for various aspects of the present disclosure. The SRS module 208 may include various hardware components and/or software components to assist in determining what particular precoding to use for the precoded SRS, as well as how to transmit both the precoded SRS and the unprecoded SRS (e.g., using TDM, FDM, or different subframes). In some embodiments, the SRS module 208 does not determine dynamically how to transmit, but rather checks its memory 204 to determine what approach had been established previously with the serving eNB 104. This may also be referred to as a static approach. In other embodiments, the SRS module 208 dynamically determines how to transmit (e.g., what precoding to use, what order to use, etc.). For example, upon receipt of CSI-RS (or some other RS) from its serving eNB 104, may analyze channel conditions based on the received RS to determine what precoding to use in the UL for the SRS. In yet other embodiments, the eNB 104 may provide instruction on what precoding the UE 102 should use. Where the eNB 104 provides instruction on what precoding to use for the SRS, the SRS module 208 may control respective aspects of the UE 102 in order to implement that instruction.

As shown, the transceiver 210 may include the modem subsystem 212 and the radio frequency (RF) unit 214. The transceiver 210 can be configured to communicate bi-directionally with other devices, such as base stations 104 and/or other network elements. The modem subsystem 212 may be configured to modulate and/or encode data according to a MCS, e.g., a LDPC coding scheme, a turbo coding scheme, a convolutional coding scheme, a polar coding scheme, etc. For example, this may be performed based on an allocation/assignment provided from the eNB 104 in response to the eNB 104's receipt of both the precoded SRS and unprecoded SRS previously. The RF unit 214 may be configured to process (e.g., perform analog to digital conversion or digital to analog conversion, etc.) modulated/encoded data from the modem subsystem 212 (on outbound transmissions) or of transmissions originating from another source such as an eNB 104. Although shown as integrated together in transceiver 210, the modem subsystem 212 and the RF unit 214 may be separate devices that are coupled together at the UE 102 to enable the UE 102 to communicate with other devices.

The RF unit 214 may provide the modulated and/or processed data, e.g. data packets (or, more generally, data messages that may contain one or more data packets and other information) such as SRS and PUSCH data of the present disclosure, to the antenna 216 for transmission to one or more other devices. The antenna 216 may further receive data messages transmitted from other devices and provide the received data messages for processing and/or demodulation at the transceiver 210. As illustrated, antenna 216 may include multiple antennas in a MIMO configuration of similar or different designs in order to sustain multiple transmission links for such things as spatial diversity, for implementation of precoding according to embodiments of the present disclosure.

Figure 3:
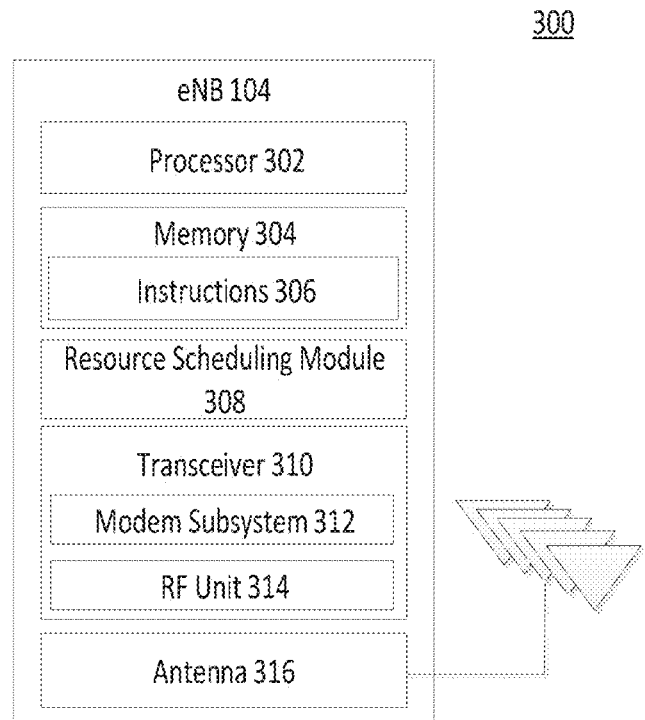
FIG. 3 is a block diagram of an exemplary wireless communication device according to embodiments of the present disclosure.

FIG. 3 is a block diagram of an exemplary wireless communication device 300 according to embodiments of the present disclosure. The wireless communication device 300 may be an eNB having any one of many configurations described above. For purposes of example, wireless communication device 300 may be an eNB 104 as discussed above with respect to FIG. 1. The eNB 104 may include a processor 302, a memory 304, a resource scheduling module 308, a transceiver 310 (including a modem 312 and RF unit 314), and an antenna 316. These elements may be in direct or indirect communication with each other, for example via one or more buses.

The processor 302 may have various features as a specific-type processor. For example, these may include a CPU, a DSP, an ASIC, a controller, an FPGA device, another hardware device, a firmware device, or any combination thereof configured to perform the operations described herein with reference to the eNBs 104 introduced in FIG. 1 above. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), RAM, MRAM, ROM, PROM, EPROM, EEPROM, flash memory, solid state memory device, hard disk drives, other forms of volatile and non-volatile memory, or a combination of different types of memory. In some embodiments, the memory 304 may include a non-transitory computer-readable medium. The memory 304 may store instructions 306. The instructions 306 may include instructions that, when executed by the processor 302, cause the processor 302 to perform operations described herein with reference to an eNB 104 in connection with embodiments of the present disclosure.

The resource scheduling module 308 may be used for various aspects of the present disclosure. The resource scheduling module 308 may include various hardware components and/or software components to assist in performing UL PUSCH scheduling, such as RB allocation, UL rank, UL MCS, etc., upon receiving precoded SRS and unprecoded SRS from UEs 102 (whether in the same subframe using TDM or FDM or different subframes). In making the determinations, the eNB 104 may use any combination of the precoded SRS and unprecoded SRS. For example, in MU-MIMO situations, the eNB 104 may use the precoded/unprecoded SRS to determine how to best consider UEs 102 jointly, or individual UEs 102 when single UE-MIMO exists.

For example, the resource scheduling module 308 may determine to use the received precoded SRS for one aspect of scheduling/assignment and the received unprecoded SRS for another aspect of scheduling/assignment based on existing channel conditions—e.g., unprecoded SRS for RB allocation, precoded SRS for rank assignment, and both for MCS scheduling. Any combination is possible of the SRS in order to arrive at scheduling/assignment according to embodiments of the present disclosure.

Further, the resource scheduling module 308 may determine PUSCH precoding parameters for the UE 102 and cause the transceiver 310 to transmit instruction regarding that determination to the UE 102. For example, after receiving both precoded SRS and unprecoded SRS from an UE 102, the resource scheduling module 308 may determine that the UE 102 will use the same precoding as was used for the SRS (e.g., because one or more signal characteristics from the SRS (precoded and/or unprecoded) meet one or more target thresholds). In that example, the resource scheduling module may set a single bit in a DL message (e.g., in the DL control channel) to signal the UE 102 (e.g., the bit asserted) to use the same precoding for PUSCH data transmission. When the same precoding is not going to be used, then the resource schedule module 308 may not set that bit (e.g., not asserted). Other approaches to signaling the precoding determination may alternatively be used as well.

Where the resource scheduling module 308 determines that the same precoding will not be used for data transmission in the PUSCH, it may determine what precoding to assign the UE 102 to use for the data. With that determination, the resource scheduling module 308 may then send the indication of the PUSCH data precoding to the UE 102. In some examples, the resource scheduling module 308 may include the full precoding data (i.e., all parameters specified for the UE 102 to use) for use in PUSCH by the UE 102. In other examples, the resource scheduling module 308 may reduce the signaling overhead involved by determining a delta between the precoding used for the SRS by the UE 102 and the precoding determined for use for the PUSCH data. The resource scheduling module 308 may cause the transceiver 310 transmit that delta, instead of the full details of the precoding for the PUSCH, to the UE 102. This may provide more efficient use of resources as the signaling overhead may be reduced as compared to the other option. This may be a static arrangement between the UE 102 and the eNB 104 (i.e., preset prior to use) or dynamic with appropriate signaling between the devices to identify that the instruction is coming, and in what format.

As shown, the transceiver 310 may include the modem subsystem 312 and the RF unit 314. The transceiver 310 can be configured to communicate bi-directionally with other devices, such as UEs 102 and/or other network elements. The modem subsystem 312 may be configured to modulate and/or encode data according to a MCS, e.g., a LDPC coding scheme, a turbo coding scheme, a convolutional coding scheme, a polar coding scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 102.

Although shown as integrated together in transceiver 310, the modem subsystem 312 and the RF unit 314 may be separate devices that are coupled together at the eNB 104 to enable the eNB 104 to communicate with other devices. The RF unit 314 may provide the modulated and/or processed data, e.g. data packets (or, more generally, data messages that may contain one or more data packets and other information) to the antenna 316 for transmission to one or more other devices. The antenna 316 may further receive data transmitted from other devices and provide the received data messages for processing and/or demodulation at the transceiver 310. This may include, for example, receiving the precoded SRS and unprecoded SRS from UEs 102 and transmitting PUSCH data precoding assignments according to embodiments of the present disclosure. As illustrated, antenna 316 may include multiple antennas in a MIMO configuration of similar or different designs in order to sustain multiple transmission links.

Figure 4:
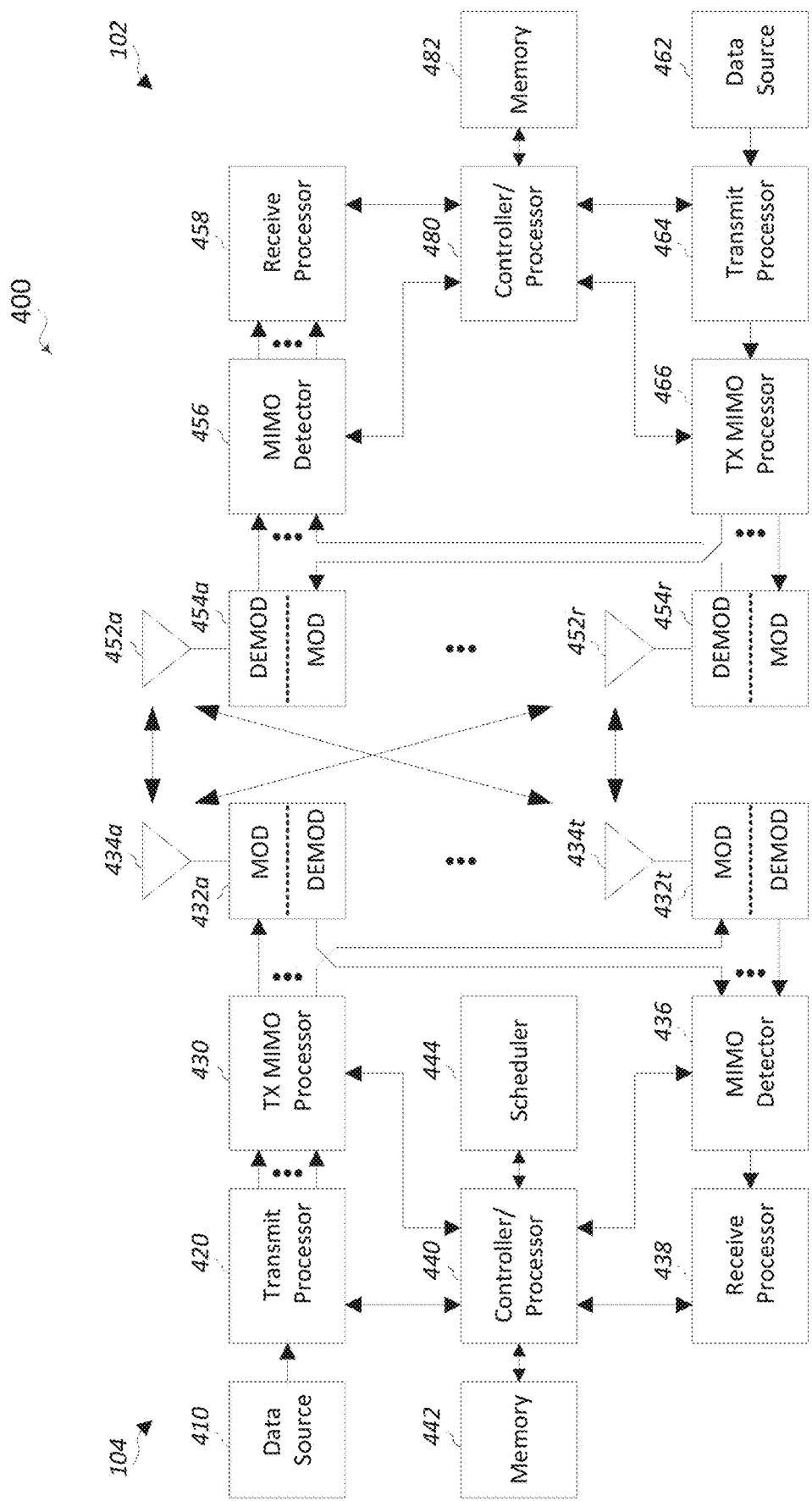
FIG. 4 is a block diagram illustrating an exemplary transmitter and receiver system, such as eNodeB and user equipment, in accordance with various aspects of the present disclosure.

FIG. 4 shows a block diagram illustrating communication between two wireless communication devices of a MIMO system 400 in accordance with the present disclosure. For sake of clarity in explanation, an eNB 104 and a UE 102 are shown. However, it is understood that the following description is applicable to communication between any two wireless communication devices in accordance with the present disclosure. Further, the following discussion will focus on those aspects pertinent to the present disclosure; as will be recognized, the elements of FIG. 4 may be further used for other purposes.

At the eNB 104, a transmit processor 420 may receive data from a data source 410 and control information from a controller/processor 440. The data rate, coding, and modulation for each data stream may be determined by instructions performed by processor 430. The transmit processor 420 may process (e.g., encode and symbol map) the data and control information to obtain data symbols and control symbols, respectively. This may include, for example, symbol mapping based on a particular modulation scheme (e.g., BPSK, QSPK, M-PSK, or M-QAM). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t.

Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via antennas 434a through 434t, respectively. As some examples, the antennas 434a through 434t may transmit DCI, RS, and regular data where the eNB 104 is the one serving the UE 102 that is the targeted recipient. Embodiments of the present disclosure include having multiple antennas.

At the UE 102, antennas 452a through 452r may receive the downlink signals from the eNB 104 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 102 (e.g., RS, regular data, and PUSCH data precoding as just some examples pertinent to embodiments of the present disclosure), and provide decoded control information to a controller/processor 480.

On the uplink, at the UE 102, a transmit processor 464 may receive and process data from a data source 462 and control information from the controller/processor 480. The data may include precoded SRS and unprecoded SRS, regular UL data precoded according to instructions from the eNB 104 and directed to the serving eNB 104, and/or connection setup or response information. The transmit processor 464 may also generate other reference symbols for a reference signal.

The symbols from the transmit processor 464 may be precoded by a TX MIMO processor 466, further processed by the modulators 454a through 454r (e.g., for SC-FDM, etc.), and transmitted to the eNB 104. For example, for the precoded SRS, the weights may be processed by the modulators 454a through 454r to cause the MIMO antennas 452a through 452r. At the eNB 104, the uplink signals from the UE 102 may be received by the antennas 434, processed by the demodulators 432, detected by a MIMO detector 436, if applicable, and further processed by a receive processor 438 to obtain decoded data and control information sent by the UE 102 (e.g., precoded SRS and unprecoded SRS). The processor 438 may provide the decoded data to a data sink and the decoded control information to the controller/processor 440.

The controllers/processors 440 and 480 may direct the operation at the eNB 104 and the UE 102, respectively. The controller/processor 440 and/or other processors and modules at the eNB 104 may perform or direct the execution of various processes for the techniques described herein, including sending SRS precoding information (where applicable), determining UL PUSCH scheduling based on precoded SRS and unprecoded SRS, and PUSCH data precoding assignments, etc. The controllers/processor 480 and/or other processors and modules at the UE 102 may also perform or direct the execution of the various processes for the techniques described herein, including determining particular SRS precoding parameters and determining PUSCH data precoding per eNB 104 instruction.

In this regard, the memories 442 and 482 may store data and program codes for the eNB 104 and the UE 102, respectively, to perform or direct the execution of these various processes. A scheduler 444 may schedule wireless communication devices for data transmission on the downlink and/or uplink.

Figure 5A:
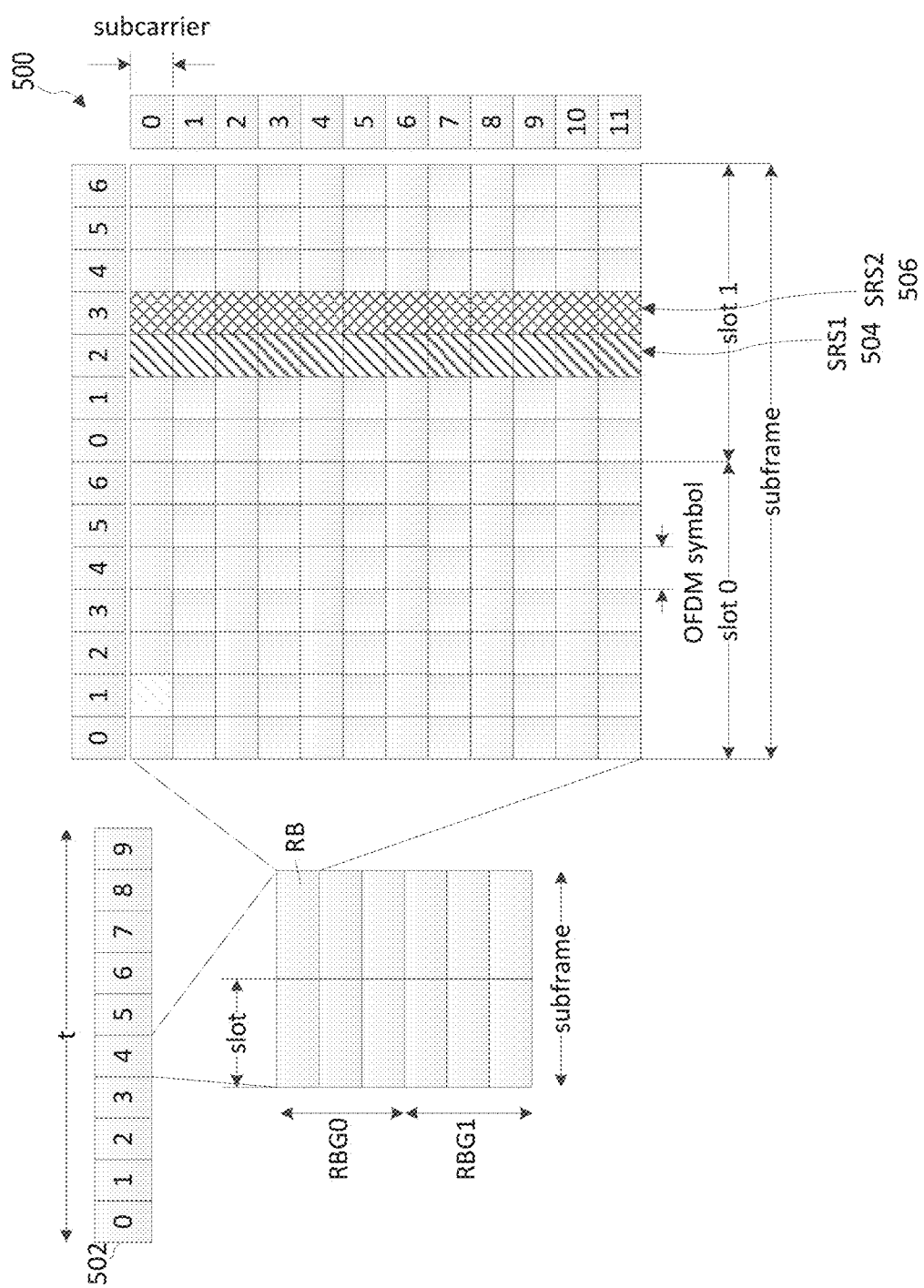
FIG. 5A is a block diagram of an exemplary uplink frame structure according to embodiments of the present disclosure.

FIG. 5A is a block diagram of an exemplary uplink frame structure 500 according to embodiments of the present disclosure. It provides an illustrative example of how an uplink subframe may be organized with respect to precoded SRS and unprecoded SRS when relying on TDM for transmitting both in a given subframe (whether using periodic or aperiodic SRS). A frame 502 may have a duration t (e.g., 10 ms) and may be divided into some number of equally sized subframes (e.g., 10). In other embodiments, the frame 502 may have a shorter duration (e.g., for higher frequency/latency requirement uses to name just one example).

Each subframe may include consecutive time slots, such as two. A resource grid may be used to represent two time slots, each time slot including a resource block (RB). Further, multiple RBs (e.g., representing multiple groupings of subcarriers) may be grouped together as the RBGs mentioned above with respect to FIG. 1. The resource grid (illustrated in FIG. 5A with respect to a particular RB) may be divided into multiple resource elements. For a cyclic prefix (e.g., according to LTE), a resource block may contain 12 consecutive subcarriers in the frequency domain and 7 consecutive OFDM symbols in the time domain, for a total of 84 resource elements. For an extended cyclic prefix, an RB may contain 12 consecutive subcarriers in the frequency domain and 6 consecutive OFDM symbols in the time domain, for a total of 72 resource elements.

According to embodiments of the present disclosure, the precoding for the SRS may be made on any of a variety of levels of granularity. For example, the precoding may be wideband, ranging down to narrowband (e.g., per tone precoding), with any value in between.

Some of the resource elements may include the UL SRS (precoded and/or unprecoded). In the example provided in FIG. 5A, both precoded SRS and unprecoded SRS are provided in the same subframe according to TDM, such that each may use the same band (depending on granularity) of tones (frequencies) but at different scheduled time slots in the subframe. FIG. 5A provides an example only—the precoded SRS and unprecoded SRS may occur at any symbols of the subframe (e.g., may occur during any time slots designated therefore in the subframe).

The example particularly illustrated in FIG. 5A provides the first SRS 504 at a first time slot and the second SRS 506 at a second time slot following the first time slot. Although illustrated as being in contiguous time slots, the time slots used in the subframe may not be contiguous to each other. The first SRS 504 may be the precoded SRS and the second SRS 506 the unprecoded SRS, or vice versa. The other resource elements may include other control and/or data symbols for either UL, DL, or some combination of both.

Figure 5B:
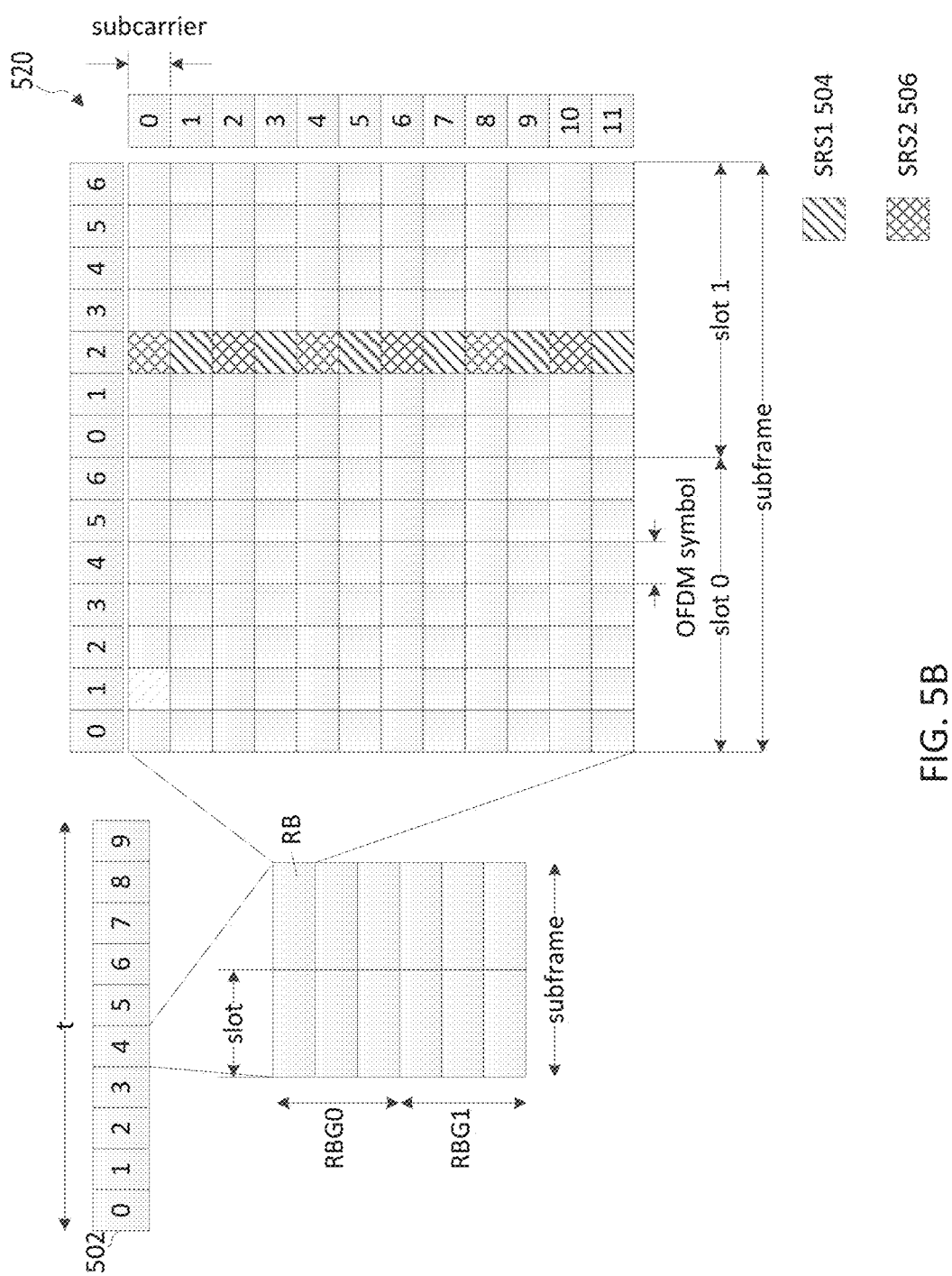
FIG. 5B is a block diagram of an exemplary uplink control message structure according to embodiments of the present disclosure.

FIG. 5B is a block diagram of an exemplary uplink frame structure 520 according to alternative embodiments of the present disclosure. It provides an illustrative example of how an uplink subframe may be organized with respect to precoded SRS and unprecoded SRS when relying on FDM for transmitting both in a given subframe (whether using periodic or aperiodic SRS). For simplicity of discussion, the differences to FIG. 5A will be emphasized.

In the example of FIG. 5B, both the precoded SRS and the unprecoded SRS are provided in the same subframe according to FDM, such that each may use the same time slot but different tones. Although illustrated as occupying a single time slot, the shared time resource may extend to more than one time slot, while still dividing up allocation of the frequencies of the resource block between the precoded SRS and unprecoded SRS in the relevant time slot(s). Again, the other resource elements may include other control and/or data symbols for either UL, DL, or some combination of both.

Figure 5C:
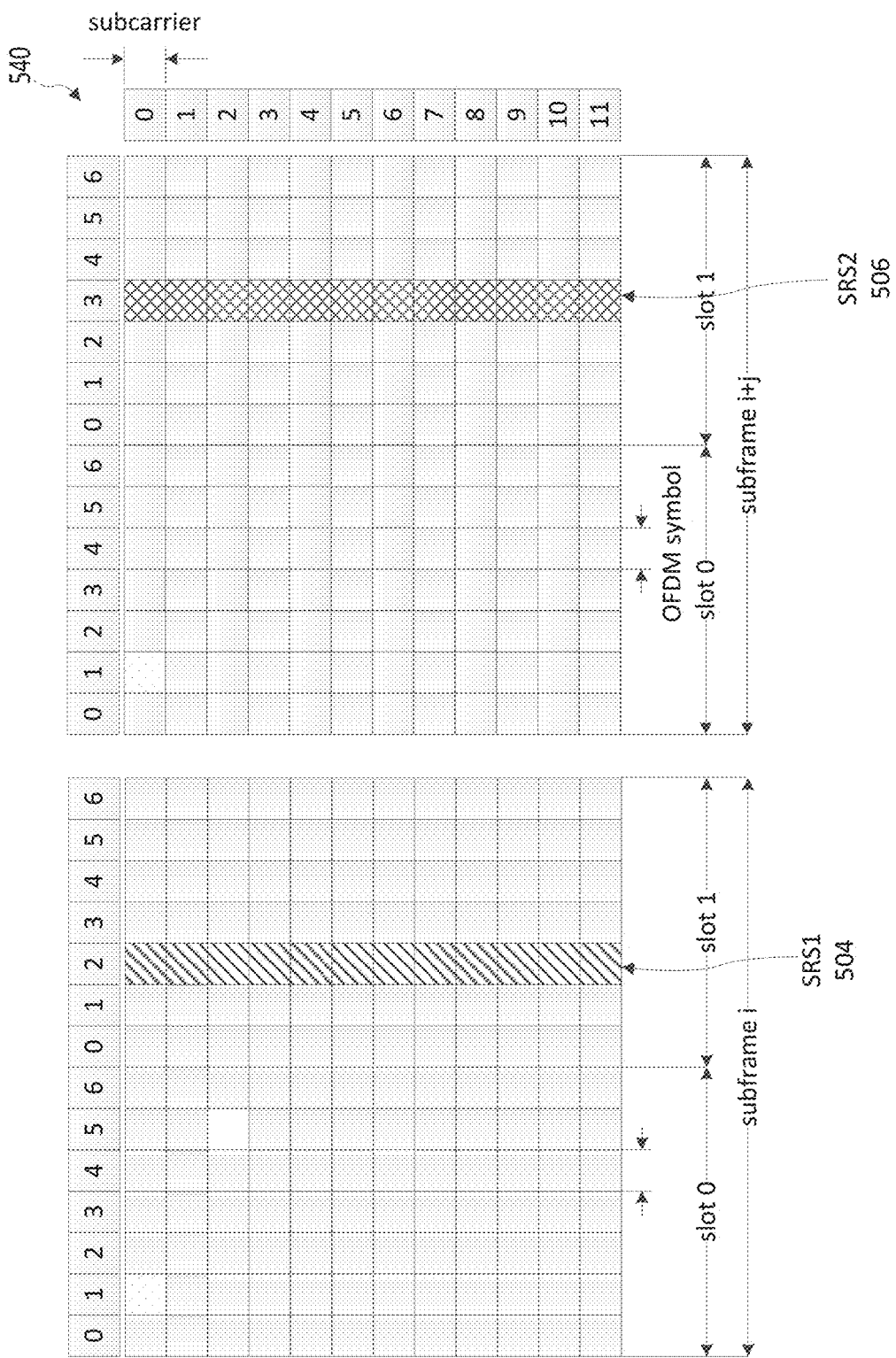
FIG. 5C is a block diagram of an exemplary uplink control message structure according to embodiments of the present disclosure.

FIG. 5C is a block diagram of an exemplary uplink frame structure 540 according to alternative embodiments of the present disclosure. It provides an illustrative example of how uplink subframes may be organized with respect to precoded SRS and unprecoded SRS when relying on use of multiple subframes for transmitting both (whether using periodic or aperiodic SRS). For simplicity of discussion, the differences to FIG. 5A/5B will be emphasized.

In the example of FIG. 5C, the precoded SRS and the unprecoded SRS are provided in different subframes identified as subframe i for SRS1 504 and subframe i+j for SRS2 506. The subframes may be adjacent to each other in time (i.e., no intervening subframes between them) or not (i.e., one or more intervening subframes between them). The SRS1 504 may be either the precoded SRS or the unprecoded SRS, with the SRS2 506 being the other of the two. As illustrated, the SRS in each subframe does not need to be assigned to the same time and/or frequency resources as the other (though such may be the case).

Figure 6:
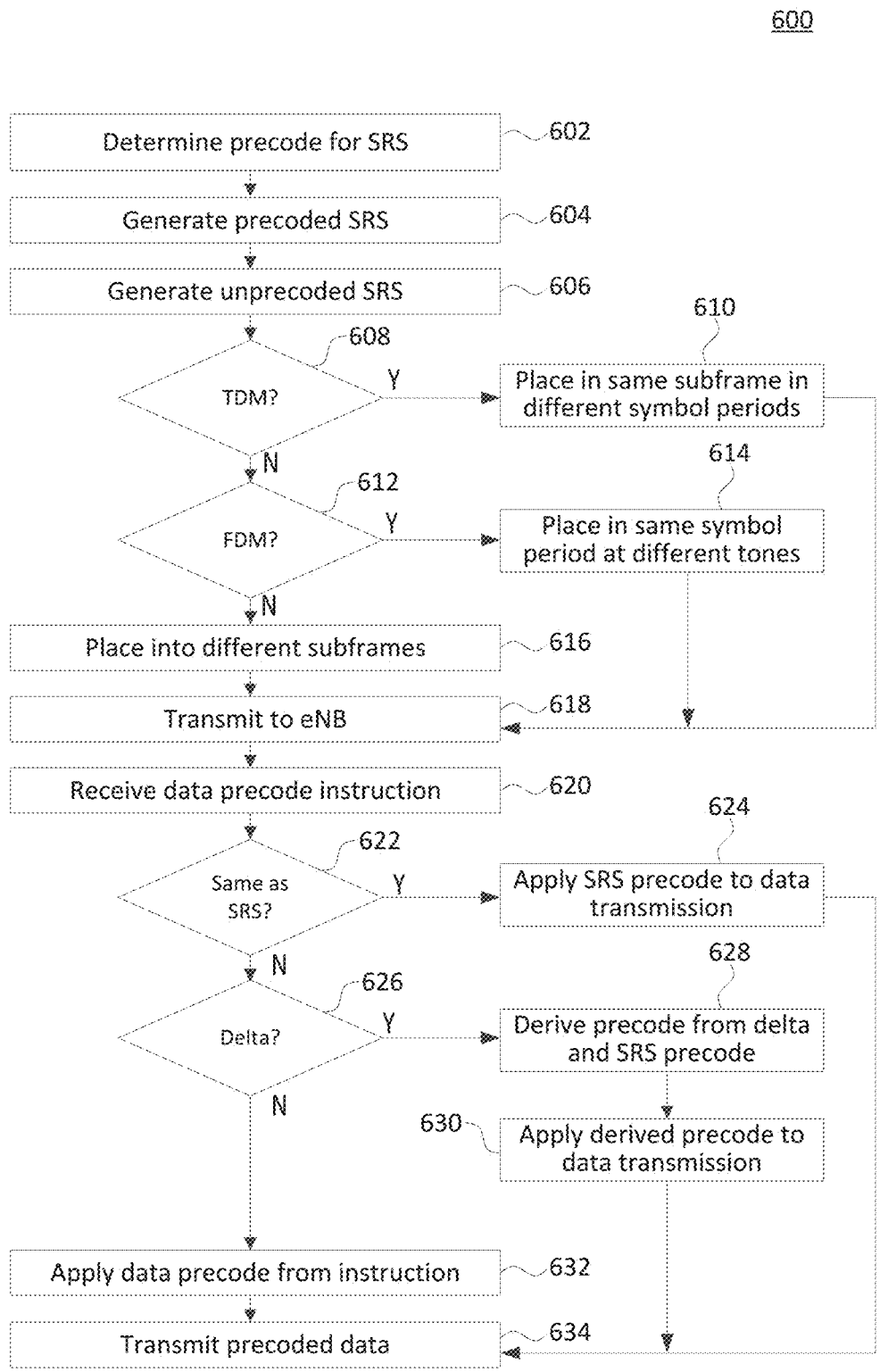
FIG. 6 is a flowchart illustrating an exemplary method for wireless communication in accordance with various aspects of the present disclosure.

Turning now to FIG. 6, a flowchart is illustrated of an exemplary method 600 for wireless communication in accordance with various aspects of the present disclosure. In particular, the method 600 illustrates the transmitting of precoded SRS and unprecoded SRS according to embodiments of the present disclosure. Method 600 may be implemented by a given UE 102 (any number of UEs 102, with focus on one for simplicity of discussion herein). It is understood that additional steps can be provided before, during, and after the steps of method 600, and that some of the steps described can be replaced or eliminated from the method 600.

At block 602, the UE 102 determines how to precode an SRS. This may be done, for example, the UE 102 may receive one or more downlink (DL) reference signals, such as CSI-RS, from an eNB 104 and, according to the channel quality of the DL channel determined from the reference signals, identify a direction that is desirable in which to steer a beam of the UE 102. Where the eNB 104 provides instruction on a precoding to apply for SRS, the UE 102 may access that instruction at block 602.

At block 604, the UE 102 generates the precoded SRS according to the information determined from block 602.

At block 606, the UE 102 generates the unprecoded SRS. Although described as occurring at a subsequent block to block 604, this may occur prior to or concurrent with block 604.

At decision block 608, if TDM is used for conveying the precoded SRS and unprecoded SRS to the eNB 104, then the method 600 proceeds to block 610. As noted previously, whether to use TDM may have been established previously between the UE 102 and the eNB 104.

At block 610, the UE 102 places the precoded SRS and the unprecoded SRS into the same subframe in different symbol periods. These may be adjacent time slots (symbol periods) or nonadjacent.

Returning to decision block 608, if TDM is not used, then the method 600 may instead proceed to decision block 612.

At decision block 612, if FDM is used for conveying the precoded SRS and the unprecoded SRS to the eNB 104, then the method 500 proceeds to block 614.

At block 614, the UE 102 places the precoded SRS and the unprecoded SRS into the same subframe in different tones (frequency elements) at the same time slot (symbol period).

Returning to decision block 612, if FDM is not used, then the method 600 may instead proceed to block 616.

At block 616, since TDM and FDM are not being used, the UE 102 places the precoded SRS and the unprecoded SRS into different subframes. These subframes may be adjacent to each other or have one or more intervening subframes. Further, the particular resource elements used in each subframe may vary from each other and over time.

From any of blocks 610, 614, or 616, the method 600 proceeds to block 618.

At block 618, the UE 102 transmits the precoded SRS and the unprecoded SRS to the eNB 104 according to the approach taken to place the precoded SRS and unprecoded SRS into one or more subframes.

At block 620, the UE 102 may receive data precoding instruction from the eNB 104 for use in the PUSCH. Although illustrated as following each SRS transmission, multiple SRS transmissions may occur between precoding assignments for PUSCH data transmissions.

At decision block 622, if the data precoding instruction identifies that the UE 102 should use the same precoding as was used for the precoded SRS, then the method 600 proceeds to block 624. This may be identified by the setting of a given bit in a DL message from the eNB 104, which the UE 102 checks for in DL messages it receives.

At block 624, the UE 102 applies the same precoding as was used for the SRS to the antennas for use in transmission of data on the PUSCH to the eNB 104.

Returning to decision block 622, if the data precoding instruction does not identify that the same precoding should be used, then the method 600 instead proceeds to decision block 626. This may be identified by checking the DL messages for the bit in the header and that it is not set.

At decision block 626, the UE 102 proceeds with determining whether the eNB 104 uses delta signaling to identify the precoding to be used for PUSCH data. This may be determined by checking a procedure previously agreed upon between the devices or based upon an explicit identification from the eNB 104 at the time that delta signaling is to be used. If delta signaling is used, then the method 600 proceeds to block 628.

At block 628, the UE 102 obtains the delta information received from the eNB 104 and derives the data precoding to be used on the PUSCH data. For example, the UE 102 may recover the precoding for PUSCH by adding or multiplying the delta information with the precoding previously used for the SRS (whether addition or multiplication is used may be configured previously between the eNB 104 and UE 102, such as at device initialization or other time).

At block 630, the UE 102 applies the precoding derived from block 628 for use in transmission of data on the PUSCH to the eNB 104.

Returning to decision block 626, if it is determined that the eNB 104 did not use delta signaling, then the method 600 proceeds to block 632.

At block 632, the UE 102 extracts the explicitly identified precoding data for use in PUSCH data by the UE 102. This may be extracted from a DL message from the eNB 104 that was received previously or at the time.

From any of blocks 624, 630, or 632, the method 600 proceeds to block 634.

At block 634, the UE 102 transmits data on the PUSCH with precoding as determined from blocks 624, 630, or 632 as the case may be.

The above actions may repeat during operation (e.g., SRS either periodically or aperiodically and likewise for the PUSCH precoding assignments).

Figure 7:
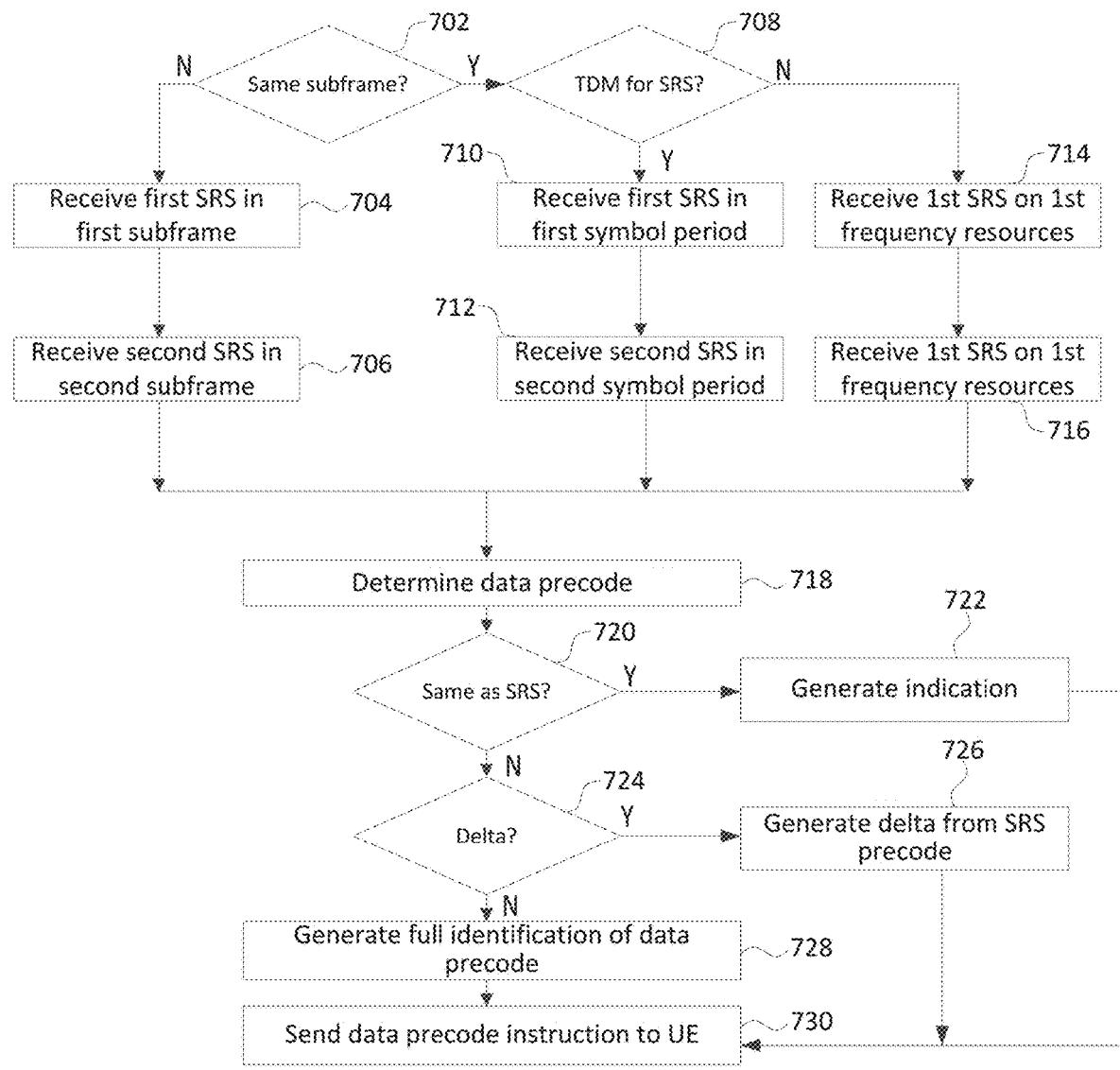
FIG. 7 is a flowchart illustrating an exemplary method for wireless communication in accordance with various aspects of the present disclosure.

Turning now to FIG. 7, a flowchart is illustrated of an exemplary method 700 for wireless communication in accordance with various aspects of the present disclosure. In particular, the method 700 illustrates the reception and processing of precoded SRS and unprecoded SRS according to embodiments of the present disclosure. Method 700 may be implemented by an eNB 104 (any number of eNBs 104 in communication with any number of UEs 102, focusing on one for simplicity of discussion here). It is understood that additional steps can be provided before, during, and after the steps of method 700, and that some of the steps described can be replaced or eliminated from the method 700.

At decision block 702, if the precoded SRS and unprecoded SRS are not received in the same subframe, then the method 700 proceeds to block 704.

At block 704, the eNB 104 receives a first SRS in a first subframe. For example, the first SRS may be a precoded SRS. Alternatively, the first SRS may be an unprecoded SRS.

At block 706, the eNB 104 receives a second SRS in a second subframe that occurs after the first subframe. For example, the second SRS may be an unprecoded SRS. Alternatively, the second SRS may be a precoded SRS (either way, one is unprecoded and the other precoded in respective subframes).

Returning to decision block 702, if the precoded SRS and unprecoded SRS are received in the same subframe, then the method 700 proceeds to decision block 708.

At decision block 708, if TDM is used then the method 700 proceeds to block 710.

At block 710, the eNB 104 receives a first SRS in a first symbol period of a given subframe. For example, the first SRS may be a precoded SRS. Alternatively, the first SRS may be an unprecoded SRS.

At block 712, the eNB 104 receives a second SRS in a second symbol period that is different from the first symbol period but still in the same given subframe. For example, the second SRS may be an unprecoded SRS. Alternatively, the second SRS may be a precoded SRS.

Returning to decision block 708, if TDM is not used then the method 700 proceeds to block 714.

At block 714, the eNB 104 receives a first SRS on a first set of frequency resources (tones) of a given subframe. For example, the first SRS may be a precoded SRS. Alternatively, the first SRS may be an unprecoded SRS.

At block 716, the eNB 104 receives a second SRS on a second set of frequency resources different from the first set of frequency resources but still in the same given subframe at time slot. For example, the second SRS may be an unprecoded SRS. Alternatively, the second SRS may be a precoded SRS. Although blocks 714 and 716 are listed separately, these actions may occur together at the eNB 104 as each is received at the same time slot(s), albeit at different frequency resources.

From any of blocks 706, 712, and 716, the method 700 proceeds to block 718.

At block 718, the eNB 104 determines what data precode assignment for PUSCH to provide to the UE 102, and how to provide the assignment to the UE 102.

At decision block 720, if the same precoding assignment for PUSCH as was used for the precoded SRS is made, then the method 700 proceeds to block 722.

At block 722, the eNB 104 generates an indication for the UE 102 to use the same precoding. For example, the eNB 104 may set a bit in a DL control message (e.g., asserting it to indicate to use the same precoding).

Returning to decision block 720, if the same precoding assignment is not intended for the PUSCH, then the method 700 proceeds to decision block 724.

At decision block 724, if the eNB 104 is using delta signaling to identify the data precoding for PUSCH, then the method 700 proceeds to block 726.

At block 726, the eNB 104 generates the delta between the target data precoding for PUSCH and the precoding that the UE 102 used for the previously received precoded SRS. This may be generated so that the UE 102 uses addition to recreate the precoding assignment, or alternatively multiplication depending on how previously established between the entities.

Returning to decision block 724, if the eNB 104 is not using delta signaling to identify the data precoding for PUSCH, then the method 700 proceeds to block 728.

At block 728, the eNB 104 generates a full identification of the data precoding for the PUSCH, which will be included in a DL message to the UE 102.

From any of blocks 722, 726, and 728, the method 700 proceeds to block 730.

At block 730, the eNB 104 sends the data precode instruction to the UE 102 for the UE 102 to use in UL PUSCH transmissions.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C). It is also contemplated that the features, components, actions, and/or steps described with respect to one embodiment may be structured in different order than as presented herein and/or combined with the features, components, actions, and/or steps described with respect to other embodiments of the present disclosure.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method, comprising:
receiving, by a first wireless communications device, a precoded sounding reference signal (SRS) from a second wireless communications device;
receiving, by the first wireless communications device, an unprecoded SRS separate from the precoded SRS from the second wireless communications device;
determining, by the first wireless communications device, a resource scheduling for the second wireless communications device based on a combination of the precoded SRS and the unprecoded SRS;
generating, by the first wireless communications device, a precode instruction for the second wireless communications device for data transmission on an uplink channel, wherein the generating comprises:
determining, by the first wireless communications device, a delta between a desired precoding and an existing precoding used for the precoded SRS; and
including, by the first wireless communications device, the delta as the precode instruction.

2. The method of claim 1, further comprising:
transmitting, by the first wireless communications device, a resource scheduling message comprising the determined resource scheduling to the second wireless communications device.

3. The method of claim 1, wherein:
the receiving the precoded SRS comprises receiving during a first symbol period of a subframe, and
the receiving the unprecoded SRS comprises receiving during a second symbol period of the subframe.

4. The method of claim 1, wherein:
the receiving the precoded SRS comprises receiving during a symbol period of a subframe using a first plurality of frequency resources, and
the receiving the unprecoded SRS comprises receiving during the symbol period of the subframe using a second plurality of frequency resources different from the first plurality of frequency resources.

5. The method of claim 1, wherein:
the receiving the precoded SRS comprises receiving the precoded SRS during a first subframe, and
the receiving the unprecoded SRS comprises receiving the unprecoded SRS during a second subframe after the first subframe.

6. The method of claim 1, wherein the precode instruction directs the second wireless communications device to apply a precoding used for the precoded SRS for data transmission.

7. An apparatus, comprising:
a transceiver configured to:
receive a precoded sounding reference signal (SRS) from a wireless communications device; and
receive an unprecoded SRS separate from the precoded SRS from the wireless communications device; and
a processor configured to:
determine a resource scheduling for the second wireless communications device based on a combination of the precoded SRS and the unprecoded SRS;
generate a precode instruction for the wireless communications device for data transmission on an uplink channel;
determine a delta between a desired precoding and an existing precoding used for the precoded SRS; and
include the delta as the precode instruction.

8. The apparatus of claim 7, wherein the transceiver is further configured to:
transmit a resource scheduling message comprising the determined resource scheduling to the wireless communications device.

9. The apparatus of claim 7, wherein:
the transceiver is configured to receive the precoded SRS during a first symbol period of a subframe, and
the transceiver is configured to receive the unprecoded SRS during a second symbol period of the subframe.

10. The apparatus of claim 7, wherein:
the transceiver is configured to receive the precoded SRS during a symbol period of a subframe using a first plurality of frequency resources, and
the transceiver is configured to receive the unprecoded SRS during the symbol period of the subframe using a second plurality of frequency resources different from the first plurality of frequency resources.

11. A non-transitory computer-readable medium having program code recorded thereon, the program code comprising:
code for causing a first wireless communications device to receive a precoded sounding reference signal (SRS) from a second wireless communications device;
code for causing the first wireless communications device to receive an unprecoded SRS separate from the precoded SRS from the second wireless communications device; and
code for causing the first wireless communications device to determine a resource scheduling for the second wireless communications device based on a combination of the precoded SRS and the unprecoded SRS;
code for causing the first wireless communications device to generate a precode instruction for the second wireless communications device for data transmission on an uplink channel, the code for causing the generating further comprises:
code for causing the first wireless communications device to determine a delta between a desired precoding and an existing precoding used for the precoded SRS; and
code for causing the first wireless communications device to include the delta as the precode instruction.

12. The non-transitory computer-readable medium of claim 11, the code further comprising:
code for causing the first wireless communications device to transmit a resource scheduling message comprising the determined resource scheduling to the second wireless communications device.

13. The non-transitory computer-readable medium of claim 11, wherein:
the code for causing the first wireless communication device to receive the precoded SRS comprises receipt during a first symbol period of a subframe, and
the code for causing the first wireless communication device to receive the unprecoded SRS comprises receipt during a second symbol period of the subframe.

14. The non-transitory computer-readable medium of claim 11, wherein:
the code for causing the first wireless communication device to receive the precoded SRS comprises receipt during a symbol period of a subframe using a first plurality of frequency resources, and the code for causing the first wireless communication device to receive the unprecoded SRS comprises receipt during the symbol period of the subframe using a second plurality of frequency resources different from the first plurality of frequency resources.

\* \* \* \* \*